United States Patent [19]
Shinjou et al.

[11] Patent Number: 4,795,559
[45] Date of Patent: Jan. 3, 1989

[54] SEMIPERMEABLE MEMBRANE SUPPORT

[75] Inventors: Ietsugu Shinjou, Shiga; Rikuo Shoji, Moriyama, both of Japan

[73] Assignee: Firma Carl Freudenberg, Weinheim an der Bergstrasse, Fed. Rep. of Germany

[21] Appl. No.: 79,651

[22] Filed: Jul. 30, 1987

Related U.S. Application Data

[62] Division of Ser. No. 841,244, Mar. 19, 1986, Pat. No. 4,728,394.

[30] Foreign Application Priority Data

Mar. 29, 1985 [JP] Japan .................................. 60-67420

[51] Int. Cl.$^4$ ......................... B01D 13/00; C02F 1/44
[52] U.S. Cl. ................................ 210/490; 210/500.27
[58] Field of Search ................ 162/146; 210/490–492, 210/500.27–500.43

[56] References Cited

U.S. PATENT DOCUMENTS

| | | | |
|---|---|---|---|
| 3,573,158 | 3/1971 | Pall et al. | 162/146 X |
| 3,762,566 | 10/1973 | Del Pico | 210/490 |
| 3,853,757 | 12/1974 | Pages | 210/490 X |
| 3,912,834 | 10/1975 | Imai et al. | 210/490 X |
| 3,950,255 | 4/1976 | Ishii et al. | 210/490 |
| 4,134,742 | 1/1979 | Schell | 210/490 X |
| 4,214,994 | 7/1980 | Kitano et al. | 210/490 |
| 4,454,176 | 6/1984 | Buckfelder et al. | 210/490 X |
| 4,514,302 | 4/1985 | van Zon et al. | 210/491 X |
| 4,707,265 | 11/1987 | Barnes, Jr. et al. | 210/490 X |
| 4,728,394 | 3/1988 | Shinjou et al. | 162/132 X |

FOREIGN PATENT DOCUMENTS

| | | |
|---|---|---|
| 15398 | 4/1977 | Japan . |
| 132605 | 10/1980 | Japan . |
| 39807 | 8/1982 | Japan . |
| 49408 | 3/1983 | Japan . |
| 79506 | 5/1983 | Japan . |

Primary Examiner—Robert Spitzer
Attorney, Agent, or Firm—Felfe & Lynch

[57] ABSTRACT

Disclosed is a semipermeable membrane support and a process for making the same. The support is formed of a non-woven fabric of a laminated structure having a low density layer with an air permeability of 5 to 50 cc/cm$^2$/sec and a high density layer with an air permeability of 0.1 cc/cm$^2$ to 5 cc/cm$^2$/sec, the non-woven fabric having an overall air permeability of 01 to 4.5 cc/cm$^2$/sec. The process for preparing such a support consists of laminating a dry processed web, which is entirely of polyester fibers containing 20 to 80% of undrawn polyester fiber or conjugate polyester fibers having an average fiber denier of 1 to 3 denier formed through a dry process, and an un-press-treated wet processed web, which is entirely of polyester fibers containing 30 to 90% of undrawn polyester fibers or conjugate polyester fibers having a fiber denier of 0.1 to 1.5 denier formed through a paper making process and subsequent drying process with hot air to self-bond lightly, pressing the laminated dry processed web and wet processed web with a heated calendar at a sufficient temperature for bonding firmly the laminated webs.

13 Claims, No Drawings

SEMIPERMEABLE MEMBRANE SUPPORT

This is a divisional application of U.S. Ser. No. 841,244 filed Mar. 19, 1986, now U.S. Pat. No. 4,728,394.

BACKGROUND OF THE INVENTION

This invention relates to a semipermeable membrane support of the type which is used for precise filtrations such as in ultra-filtration and reverse osmosis. The semipermeable membrane comprises a non-woven fabric.

The demand for precise filtration is continually increasing. Such precise filtration is widely utilized in the fields of desalination of sea water, the food industry, treatment of industrial waste water, and in medical applications.

Semipermeable membranes comprising synthetic polymer, without any support, are inferior in mechanical strength. Therefore such membranes are generally used with a backing material such as woven fabric. Recently, the membrane has been formed by casting a polymer solution directly on a porous support such as a non-woven fabric.

The conventional supports generally experience a peeling off problem due to inferior affinity between the membrane and support. Another problem of conventional supports is that of pin-holes resulting from insufficient penetration of polymer solution into the support. The conventional supports also display a lack of uniformity in mechanical properties such as strength.

Various modifications have been proposed to eliminate these defects. One such method described in Japanese Patent Publication No. 52 (1977)-15398, involves dissolving a part of the support with a polymer solution. Another approach, as described in Japanese Patent Provisional Publication No. 55 (1980)-132065, is in increasing the affinity by previous immersion of the support in the same solvent as used for the polymer solution. Japanese Patent Provisional Publication No. 58 (1983)-49408 suggests stepwise casting of a high viscous solution and a low viscous solution.

Conventional supports are generally of woven and knitted fabrics, non-woven fabric, porous sintered material, or paper. However, no suitable base material especially for semipermeable membrane is available. Even and dense base materials for other uses are selected as semipermeable membrane support materials.

Thus, the prior art lacks a support specifically suitable for forming semipermeable membranes. Conventional modifications require unusual processes or methods to form the membrane. It has been found that when one attempts to increase the affinity, the polymer solution is apt to penetrate through the support to the back surface and interfere with the forming of the membrane.

The method wherein a part of the support is dissolved in a polymer solution to increase the affinity requires the selection of soluble material in the support for each solvent of the polymer solution. This is not always utilized in a wide range of polymer solution for forming semipermeable membranes, and does not have a broad spectrum of usefulness. Additionally, improving the affinity by dissolution requires some period of time after the casting of a solution. Therefore the coagulation process cannot be carried out rapidly.

The above-mentioned method of Japanese Patent Provisional Publication No. 58 (1983)-79506 in which desized fabric is used involves essentially the combination of a polymer solution. This method is not always suitable to a wide range of polymer solutions for forming semipermeable membranes and thus also lacks a broad spectrum of usefulness.

In addition to the above-discussed methods, various supports which use non-woven fabric have been developed. However, supports having a high density cause insufficient penetration of the polymer solution. A consequence is the delamination between layers due to reduced peeling strength between the support and membrane. Another consequence can be the generation of pin-holes due to residual bubbles, because of insufficient de-bubbling in the support. Low density supports, in spite of sufficient penetration of a polymer solution, result in over penetration of the polymer solution to the back surface opposite to the casted surface. The resulting membranes give uneven filtration. Severe defects such as reduced filtration performance and/or damage of the semipermeable membrane due to the partial excessive pressurization during filtration operation can result.

Support materials such as paper are inherently high in density and therefore have inferior penetrability. Modified paper material of reduced density, to improve the penetrability, may cause fuzz and consequently pin-holes. Thus, a uniform membrane cannot be formed using paper material.

SUMMARY OF THE INVENTION

The present invention eliminates the prior art defects, and provides a most suitable support which can be used for a wide range of polymer solutions for the formation of semipermeable membranes without any unusual pretreatment. The resulting membranes are uniform in quality, free from pin-holes and do not experience delamination.

It has been found that an extremely suitable support for forming a semipermeable membrane by casting of a polymer solution can be formed based on a non-woven fabric. The non-woven fabric has a combined laminated double layered structure which comprises a low density layer with an air permeability of 5 to 50 cc/cm$^2$/sec and a high density layer with an air permeability of 0.1 cc/cm$^2$/sec or more and less than 5 cc/cm$^2$/sec. The resulting non-woven fabric has an overall air permeability of 0.1 to 4.5 cc/cm$^2$/sec, has a broad spectrum of use and does not experience the pin-hole problem and delamination. Air permeability is determined at a differential pressure of 2 millibars or 0.8 inches water gauge.

A process for the preparation of the above-mentioned semipermeable membrane support having the laminated construction, and which exhibits the above-mentioned air permeability characteristics, has been found. In the new process for preparation of a strong, stable, and low cost double layered semipermeable membrane support, a dry processed web is laminated with an un-press treated wet processed web. The dry processes web is comprised entirely of polyester fibers containing 20 to 80% of undrawn polyester fiber or conjugate polyester fibers. These fibers have an average fiber denier of 1 to 3 denier formed through dry processes, such as carding process. The un-press-treated wet processed web, is comprised entirely of polyester fibers containing 30 to 90% of undrawn polyester fibers or conjugate polyester fibers having a fiber denier of 0.1 to 1.5 denier formed through a paper making process and subsequent drying process with hot air to self-bond lightly. The laminated layers are then pressed with a heated calendar at a sufficient temperature to combine so the laminated webs bond firmly.

DESCRIPTION OF PREFERRED EMBODIMENT

The present invention is directed at a double layered, semipermeable, support suitable for a semipermeable membrane which has improved resistance to peeling, reduced pin-holes and forms an even membrane. Prior art attempts to achieve this result were based on the modification of chemical affinity such as the combination of components of solvent and support.

The low density layer or web may be formed by conventional dry processes such as the air-lay process and carding process. Any thermoplastic fibers, such as polyester and nylon, capable of heat-bonding, and stable against the polymer solution for preparation of the semipermeable membrane, may be used as material for the non-woven web. A web comprising entirely polyester fibers containing 20 to 80%, preferably 30 to 60%, of undrawn polyester fibers, is suitable to obtain sufficient strength as required for a semipermeable membrane support. Also, a web comprised entirely of polyester fibers containing conjugate polyester fibers and composed of lower and higher melting polyester is preferably used in substituting for undrawn polyester. If the proportion of the undrawn polyester fibers or conjugate polyester fibers, which serve as bonding fibers, is less than 20%, the product will have reduced strength and a fuzzy surface. On the other hand, if the proportion exceeds 80%, the rigidity is high and the resulting non-woven fabric has a reduced tear strength. Therefore both proportion ranges, i.e., less than 20 and greater than 80, are not suitable. Conjugate polyester fiber having a component with a melting point of 120° to 220° C. is suitable as the polyester fiber used in the present invention.

The average denier of fibers used for semipermeable membrane supports is generally from 1 to 3 denier. If the average denier is less than 1, a solution will not penetrate rapidly. If the average denier exceeds 3, the penetration retarding effect of the high density layer is undesirably suppressed and excessively rapid penetration is to be expected.

It is difficult to prevent the penetration of a polymer solution by using dry processed non-woven fabric comprising usual fibers, with a denier of 0.5 denier or more which is capable of being processed by conventional carding. In the present invention, it has been found that a high density layer having a satisfactory penetration preventing effect can be formed by using an un-calendared, wet processed web, comprising fibers of a fiber denier of 1.5 denier or less, or by using a web, no matter which dry or wet processed web is utilized, comprising fibers of modified cross-section with a denier of 1.5 denier or less. Fibers of modified cross-section in the present invention means fibers having a non-circular cross-section or fibers having unequal major and minor axes (the ratio of major axis to minor axis is termed as aspect ratio hereinafter).

In general, fibers having a cross-section which is so shaped that the air permeability is reduced by thermal bonding are preferably used. Examples of preferred cross-sectional shapes include Y-shaped, elliptical, and dumbbell-shaped. Fibers having a flat cross-section with an aspect ratio of 2 to 7 are particularly suitable. If the fiber denier exceeds 1.5 denier, the fibers are not suitable for the present invention even if the fibers have a modified cross-section because such fibers do not result in a sufficiently dense structure. It is also suitable to use micro-fine polyester fiber web having a fiber denier of $10\mu$ or less prepared by melt-blown process.

One example of the wet process is subsequently described. A web formed entirely of polyester fibers having a fiber denier of 1.5 denier or less, containing 30 to 90%, preferably 40 to 70%, of undrawn fiber is prepared by a conventional paper making process. In the conventional process, a prepared web is passed to a heated calender to press and densify the same. However, in the process of the invention, the web is dried under no-pressure at a temperature of 150° C. or lower, preferably 130° C. or lower, and 80° C. or higher so that the undrawn fibers do not completely crystallize. This temperature condition is very important when undrawn fibers are used. Undrawn fibers undergo considerable crystalization at temperatures higher than 150° C., and it becomes difficult to bond the web with the low density layer in the subsequent process of calendering treatment. Also, the low density layer itself is bonded insufficiently. This causes difficulty in densification and results in an insufficient penetration preventing effect of a polymer solution. If a temperature of lower than 80° C. is applied, the prepared web is not bonded utterly, and the web does not keep its shape. This results in problems during the lamination and calendering treatment. Accordingly, it is only with temperatures between 80° to 150° C. that the undrawn fibers properly exhibit moderate viscosity for keeping its shape of the prepared web and serve as bonding element. Under these conditions, the treatment brings about strong bonding between the two layers upon subsequent calendering and desired densification of the high density layer.

When conjugate polyester fibers are used, the fibers exhibit viscosity and may be dried at a moderate temperature such that the web is lightly self-bonded. However, it is essential to dry the web under no-pressure. If the usual heated calender treatment is applied as in the conventional wet process, the surface of the web is smoothed, and the lower melting component becomes ineffective as a bonding element in the subsequent laminating thermal bonding with the low density layer. Thus undesirable delamination will result.

When a wet process is utilized, the web may be prepared as is a dry processed non-woven fabric by calendering treatment. The wet processed web is laminated directly on the web. However the bonding between the high density layer and low density layer is apt to delaminate and the resulting laminated layer is inferior in performance when compared with the laminated layer prepared through the above-mentioned process.

In the present invention, a mixture of fibers having a modified cross-section and a fiber denier of 1.5 or less, an aspect ratio of 2 to 7, and conventional undrawn fibers or conjugated fibers can be used. For such a mixture, the proportion of the fibers with the modified cross-section lies desirably in a range from 30 to 70%, more preferably from 50 to 70%.

The preparation of a web comprising micro-fine fibers with fiber diameter of $10\mu$ or less by the melt-blown process is well known. In the present invention it is preferable that such a lightly self-bonded web is used. Since drawn and undrawn micro-fine fibers are mixed in the web prepared by the process, the web can be densified under the same conditions as applied for undrawn polyester fibers in the thermal pressing process. After lamination with the low density layer, a strong bonding is formed between the layers and the laminated layer will not delaminate.

The webs of high density and low density layers formed as described above are laminated, and combined firmly with a heated calender to form a semipermeable membrane support. The thermal pressing condition applied during the above-mentioned lamination process is controlled so that the air permeability of the layer lies in a range of 0.1 to 5 cc/cm$^2$/sec, preferably less than 4 cc/cm$^2$/sec. To provide a high density layer with the above-mentioned penetration preventing effect, a temperature of 150° to 250° C., especially 200° to 230° C., is suitable at a linear pressure of calendering of 30 kg/cm. Those of ordinary skill in the art can readily determine the heating conditions and calendering pressure (linear pressure) required in each individual case, in order to achieve the desired air permeability rates.

The semipermeable support obtained according to the present invention results in a membrane which is even and free from pin-holes by the mutual effect of the low density layer having excellent penetrativity and the high density layer having excellent penetration preventing effect. The high density layer diffuses the filtrate which has passed through the permeable membrane, but the reason is not known. The membrane also promotes generation of taper-shaped micro-pores due to the retardation of the coagulation of the polymer solution in the high density layer upon wet coagulation as described in Japanese Patent Publication No. 57 (1982)-39807.

These effects of the high density layer are by no means obtained when a dry processed web comprising fibers with the same fiber denier of 1.5 denier as that of the wet processed web is substituted for the wet processed web in the present invention, or when fibers with a conventional circular cross-section are substituted for fibers with a modified cross-section. By utilizing the melt-blown process, a non-woven fabric having an air permeability is 1/10 or less that of the above-mentioned conventional dry processed non-woven fabric can be obtained. The above-mentioned effect will be described in detail in Examples hereinafter.

According to the present invention, the bonding effect between both layers by undrawn fibers or sheath and core type or side by side type conjugate fibers containing different melting components having different melting points, is very strong. The fibers used in the present invention entirely comprise polyester fiber, and the high tearing strength of the dry processed low density layer web and the advantage, such as high tensile strength, and elongation of wet processed high density layer web can be effectively combined. Thus the support in accordance with the present invention results not only in good membrane formability but also as a most suitable reinforcing material.

Semipermeable membrane supports comprising conventional non-woven fabric or paper have the disadvantage that the strength and elongation in the machine direction and transverse direction are unequal due to the uneven orientation of fibers. It is possible according to the present invention that a support which is even in all direction can be obtained by combining prescribed layers because the support of the invention has a double layered laminated structure.

Accordingly, a support in accordance with the present invention satisfies all requirements for a semipermeable membrane support, i.e. membrane formability, membrane performance, and mechanical performance such as strength and elongation.

In the following Examples all air permeability measurements were made at a 2 millibar differential pressure as in DIN 53887.

EXAMPLE 1

50% of polyester staple fibers with a fiber denier of 1.0 denier and fiber length of 5 mm and 50% of undrawn polyester fiber with a fiber denier of 1.0 denier and fiber length of 5 mm were dispersed and wet processed by a conventional wet process to form a web of 70 g/m$^2$ on a screen as a high density layer, and then dried with warm air at 120° C. This sheet was bonded mildly with the stickiness of the undrawn fibers, was wound up to form a roll, then unrolled on a belt. A web of 100 g/m$^2$, which was prepared in a way in which 65% of polyester fibers with a fiber denier of 2.0 denier and fiber length of 38 mm and 35% of undrawn polyester fibers with a fiber denier of 2.0 denier and fiber length of 38 mm were blended, opened, and cross-laid with a cross-laier so that the fibers were oriented into the transverse direction, was laminated as the low density layer on the sheet. The laminated web was subjected to heated calender treatment at a temperature of 215° C. under a linear pressure of 30 kg/cm. A semipermeable membrane support having a double layered structure with an air permeability of 3.77 cc/cm$^2$/sec, (shown in Table 1) was obtained. To determine the air permeability of the high density layer and low density layer separately, the above-mentioned process was repeated but a thin release paper was sandwiched between the above-mentioned wet processed web and dry processed web, and each layer was peeled off. The air permeability of each layer was measured, and the values of 11.6 cc/cm$^2$/sec and 4.47 cc/cm$^2$/sec were obtained for the low density layer and high density layer respectively.

Using this support, a polymer solution comprising 17 parts by weight of polysulfone, 80 parts by weight of N-methyl pyrrolidone and 3 parts by weight of formalin was cast on the low density layer of the support. The support was allowed to stand for about 5 min to penetrate the solution, and the solution was wet-coagulated in water. The membrane prepared was essentially free from pin-holes, and even. No penetration to the back surface was observed.

EXAMPLE 2

A dry processed web of 100 g/m$^2$, was prepared as in Example 1, but 35% of sheath and core type conjugate polyester fibers with a fiber denier of 2 denier and fiber length of 51 mm containing a lower melting component having a melting temperature of 198° C. was used as a substitute for the undrawn fiber in Example 1, and was formed as the low density layer. A dry processed web of 70 g/m$^2$ was prepared from 55% of flat fibers with a fiber denier of 1.0 denier and fiber length of 38 mm having an aspect ratio of 3, by blending and dry processing with 45% of conjugate polyester fibers with a fiber denier of 1.0 denier and fiber length of 38 mm containing a lower melting component having a melting temperature of 198° C. This latter web was formed as the high density layer on the low density layer web, and both layers were then laminated by treatment with a heated calender. Thus a semipermeable membrane support having a double layeed structure with an air permeability of 1.98 cc/cm$^2$/sec was obtained. This support also exhibited excellent semipermeable membrane formability and mechanical properties as shown in Table 1.

REFERENCE EXAMPLE 1

On the same low density layer web as used in Example 1, a web of 70 g/m², was prepared. The latter web was formed from 55% of conventional polyester fibers, having a fiber denier of 1.0 denier and fiber length of 33 mm, and 45% of undrawn polyester fiber with a fiber denier of 1.0 and fiber length of 38 mm. The mixture was blended and dry processed, and was then laminated as the high density layer. The resulting double web was subjected to the thermal bonding under the same conditions as applied in Example 1. A support with an air permeability of 5.34 cc/cm²/sec was obtained.

Upon casting the same polymer solution as used in Example 1, the solution penetrated to the back surface in forming spots. Thus, an unsatisfactory membrane was obtained although the high density layer fibers had the same fiber denier or less as that of Example 1.

REFERENCE EXAMPLE 2

A single layered support of 170 g/m² was prepared using blended fibers comprising 60% of flat polyester fibers with a fiber denier of 1.5 denier and fiber length of 38 mm and conjugate fibers with a fiber denier of 1.5 denier and fiber length of 38 mm. Upon casting the same polymer solution as used in Example 1 as the support, it was observed that the penetrativity was insufficient. Partial delamination occurred between the membrane and support, and many pin-holes were generated.

EXAMPLE 3

A double layered support having an air permeability of 1.66 cc/cm²/sec was obtained through the same process as utilized in Example 1, but flat polyester fiber with a fiber denier of 1.0 denier and fiber length of 5 mm having an aspect ratio of 2.5 were substituted for the wet processed polyester fibers used in Example 1. This sheet was extremely suitable as a semipermeable membrane support.

EXAMPLE 4

The same low density layer web of 100 g/m² as used in Example 2 was laminated on a high density layer web of 70 g/m² with an average fiber diameter of 4μ prepared by the melt-blown process and self-bonded lightly. A support with an air permeability of 0.68 cc/cm²/sec was obtained. This support had inferior strength as compared to that of Examples 1, 2 and 3. The high density layer prepared by melt-blown process exhibited increased water repellency, and water scarcely penetrated into the layer upon wet coagulation to form a membrane. It is considered that this method is effective to form taper-shaped micro-pores.

The conventional preparation of a semipermeable membrane having a support requires some pre-treatment or specific combination of the solution. However, the semipermeable membrane support in accordance with the present invention does not require any complex process or specific measure for forming a membrane but still can be used with a wide range of polymer solutions for forming semipermeable membranes. The problems of control of penetration, and prevention of unevenness of the membrane, due to penetration to the back surface, are solved by the present invention while the delamination strength is improved. Furthermore, the support improves the membrane filtration performance.

TABLE 1

|  | Example-1 | Reference Example-1 | Example-2 | Reference Example-2 | Example-3 | Example-4 |
| --- | --- | --- | --- | --- | --- | --- |
| Weight (g/m²) | 170 | 170 | 170 | 170 | 170 | 170 |
| Thickness (mm) | 0.18 | 0.19 | 0.16 | 0.15 | 0.16 | 0.13 |
| Air Permeability (cc/cm²/sec) | | | | | | |
| Overall | 3.77 | 5.34 | 1.98 | 0.85 | 1.66 | 0.68 |
| Low Density Layer | 11.6 | 11.6 | 11.6 | — | 11.6 | 11.6 |
| High Density Layer | 4.47 | 9.80 | 2.81 | — | 2.32 | 0.74 |
| Pin-Hole | free | many | free | great many | free | free |
| The Penetration to the Back Surface | not observed | not observed | not observed | observed | not observed | not observed |
| Delamination | not occur | occur | not occur | not occur | not occur | not occur |
| Tensile Strength (kg/15 mm) | 15 | 14 | 18 | 19 | 15 | 12 |
| Elongation (%) | 15 | 25 | 26 | 23 | 15 | 24 |

The semipermeable membrane support of the present invention does not utilize specific processes such as powder sintering or specific material. Therefore, inexpensive and a useful base material can be used for the semipermeable membrane.

It will be understood that the specification and examples are illustrative but not limitative of the present invention and that other embodiments within the spirit and scope of the invention will suggest themselves to those skilled in the art.

What is claimed is:

1. A semipermeable membrane support comprising a non-woven fabric of a laminated structure having a low density layer with an air permeability of 5 to 50 cc/cm²/sec and a high density layer with an air permeability of 0.1 cc/cm²/sec to 5 cc/cm²/sec, said non-woven fabric having an overall air permeability of 0.1 to 4.5 cc/cm²/sec.

2. The semipermeable membrane support of claim 1, wherein the non-woven fabric comprises entirely polyester fibers containing 30 to 80% of undrawn polyester fibers or conjugate polyester fibers.

3. The semipermeable membrane support of claim 1, wherein the weight ratio of the low density layer to high density layer is in a range from 7:3 to 2:8, and the overall weight of the non-woven fabric is in a range of 70 to 250 g/m².

4. The semipermeable membrane support of claim 1, wherein the fabric is used for preparing a semipermeable membrane through casting of a polymer solution for forming semipermeable membrane to form a membrane.

5. A semipermeable membrane having a support, said support comprising a non-woven fabric of a laminated structure having a low density layer with an air permeability of 5 to 50 cc/cm²/sec and a high density layer with an air permeability of 0.1 cc/cm²/sec to 5 cc/cm²/sec, said non-woven fabric having an overall air permeability of 01 to 4.5 cc/cm²/sec.

6. The semipermeable membrane of claim 5, wherein the non-woven fabric comprises entirely polyester fibers containing 30 to 80% of undrawn polyester fibers or conjugate polyester fibers.

7. The semipermeable membrane of claim 5, wherein the weight ratio of the low density layer to high density layer is in a range from 7:3 to 2:8, and the overall weight of the non-woven fabric is in a range of 70 to 250 g/m².

8. The semipermeable membrane of claim 5, wherein the membrane is formed on the support by casting a polymer solution thereon.

9. The semipermeable membrane of claim 5, wherein the support is formed from a dry processed web, which comprises entirely polyester fibers containing 20 to 80% of undrawn polyester fiber or conjugate polyester fibers having an average fiber denier of 1 to 3 denier formed through a dry process, and an un-press-treated wet processed web, which comprises entirely polyester fibers containing 30 to 90% of undrawn polyester fibers or conjugate polyester fibers having a fiber denier of 0.1 to 1.5 denier formed through a paper making process and subsequent drying process with hot air to self-bond lightly, pressing said laminated dry processed web and wet processed web with a heated calender at a sufficient temperature for bonding firmly the laminated webs.

10. The semipermeable membrane of claim 9, wherein the wet processed web contains 20 to 70% of fibers with modified cross-section such as elliptic or Y-shaped cross-section.

11. The semipermeable membrane of claim 10, wherein the wet processed web is formed through a paper making process and is subsequently exposed to a drying process with hot air to self-bond lightly.

12. The semipermeable membrane of claim 9, wherein the dry process is a carding process.

13. The semipermeable membrane of claim 9, wherein the support is for preparation of semipermeable membrane through casting a polymer solution for semipermeable membrane to form a membrane.

* * * * *

UNITED STATES PATENT AND TRADEMARK OFFICE
CERTIFICATE OF CORRECTION

PATENT NO. : 4,795,559
DATED : January 3, 1989
INVENTOR(S) : Ietsugu Shinjou et al It is certified that error appears in the above-identified patent and that said Letters Patent is hereby corrected as shown below:

Column 9, line 2, "01" should read --0.1--.

Abstract, line 7, following "0.1 $cc/cm^2$" insert --sec--.

Abstract, line 8, "01" should read --0.1--.

Signed and Sealed this

Eighth Day of May, 1990

Attest:

HARRY F. MANBECK, JR.

*Attesting Officer*   *Commissioner of Patents and Trademarks*